United States Patent
Meijer et al.

(10) Patent No.: US 7,672,909 B2
(45) Date of Patent: Mar. 2, 2010

(54) MACHINE LEARNING SYSTEM AND METHOD COMPRISING SEGREGATOR CONVERGENCE AND RECOGNITION COMPONENTS TO DETERMINE THE EXISTENCE OF POSSIBLE TAGGING DATA TRENDS AND IDENTIFY THAT PREDETERMINED CONVERGENCE CRITERIA HAVE BEEN MET OR ESTABLISH CRITERIA FOR TAXONOMY PURPOSE THEN RECOGNIZE ITEMS BASED ON AN AGGREGATE OF USER TAGGING BEHAVIOR

(75) Inventors: Henricus Johannes Maria Meijer, Mercer Island, WA (US); Raymond E. Ozzie, Seattle, WA (US); Gary W. Flake, Bellevue, WA (US); Thomas F. Bergstraesser, Kirkland, WA (US); Arnold N. Blinn, Hunts Point, WA (US); Christopher W. Brumme, Mercer Island, WA (US); Lili Cheng, Bellevue, WA (US); Michael Connolly, Seattle, WA (US); Daniel S. Glasser, Mercer Island, WA (US); Alexander G. Gounares, Kirkland, WA (US); Matthew B. MacLaurin, Woodinville, WA (US); Debi P. Mishra, Bellevue, WA (US); Melora Zaner-Godsey, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 589 days.

(21) Appl. No.: 11/613,779

(22) Filed: Dec. 20, 2006

(65) Prior Publication Data

US 2008/0082466 A1     Apr. 3, 2008

Related U.S. Application Data

(63) Continuation-in-part of application No. 11/536,462, filed on Sep. 28, 2006.

(51) Int. Cl.
*G06F 15/18* (2006.01)
(52) U.S. Cl. .............................. 706/12; 706/20; 706/21
(58) Field of Classification Search .................... 706/12
See application file for complete search history.

(56) References Cited

U.S. PATENT DOCUMENTS 5,263,165 A    11/1993    Janis (Continued)

FOREIGN PATENT DOCUMENTS

EP            0915595 A2      5/1999

(Continued)

OTHER PUBLICATIONS

Gietz, Report on automatic classification systems for the Terena activity Portal Coordination, 2001.*

(Continued)

*Primary Examiner*—David R Vincent
*Assistant Examiner*—Nathan H Brown, Jr.
(74) *Attorney, Agent, or Firm*—Lee & Hayes, PLLC

(57) ABSTRACT

Systems and methods that recognize items based on aggregated tagging behavior of users regarding the items. Individual users can establish relationships among tagged items and the system analyzes aggregate of such established relationships, to recognize the item and/or infer additional information regarding the items (e.g., wisdom of crowd such as metadata annotations, relevance ranking, and the like). Subsequently, search engine crawlers can be supplied with such additional information (e.g., extra metadata for reverse link search tables) to facilitate enterprise management and search.

20 Claims, 13 Drawing Sheets

U.S. PATENT DOCUMENTS

| | | | |
|---|---|---|---|
| 5,495,576 | A | 2/1996 | Ritchey |
| 5,537,404 | A | 7/1996 | Bentlet et al. |
| 5,588,914 | A | 12/1996 | Adamczyk |
| 5,859,972 | A | 1/1999 | Subramaniam et al. |
| 6,064,656 | A | 5/2000 | Angal et al. |
| 6,185,567 | B1 | 2/2001 | Ratnaraj et al. |
| 6,195,683 | B1 | 2/2001 | Palmer et al. |
| 6,209,039 | B1 | 3/2001 | Albright et al. |
| 6,226,260 | B1 | 5/2001 | McDysan |
| 6,341,127 | B1 | 1/2002 | Katsube et al. |
| 6,409,599 | B1 | 6/2002 | Sprout et al. |
| 6,415,288 | B1 | 7/2002 | Gebauer |
| 6,434,532 | B2 | 8/2002 | Goldband et al. |
| 6,469,991 | B1 | 10/2002 | Chuah |
| 6,496,482 | B1 | 12/2002 | Kubota |
| 6,620,043 | B1 | 9/2003 | Haseltine et al. |
| 6,707,820 | B1 | 3/2004 | Arndt et al. |
| 6,745,224 | B1 | 6/2004 | D'Souza et al. |
| 6,917,975 | B2 | 7/2005 | Griffin et al. |
| 6,961,318 | B2 | 11/2005 | Fichou et al. |
| 7,002,926 | B1 | 2/2006 | Eneboe et al. |
| 7,020,654 | B1 | 3/2006 | Najmi |
| 7,065,041 | B2 | 6/2006 | Sen |
| 7,373,377 | B2 | 5/2008 | Altieri |
| 2002/0013792 | A1 | 1/2002 | Imielinski et al. |
| 2002/0124053 | A1 | 9/2002 | Adams et al. |
| 2003/0105734 | A1 | 6/2003 | Hitchen et al. |
| 2003/0229623 | A1 | 12/2003 | Chang et al. |
| 2004/0049537 | A1 | 3/2004 | Titmuss |
| 2004/0076160 | A1 | 4/2004 | Phaltankar |
| 2004/0098456 | A1 | 5/2004 | Kryzanowski et al. |
| 2005/0033669 | A1 | 2/2005 | Stremler et al. |
| 2005/0138419 | A1 | 6/2005 | Gupta et al. |
| 2005/0238024 | A1 | 10/2005 | Taylor et al. |
| 2005/0262132 | A1 | 11/2005 | Morita et al. |
| 2005/0289234 | A1 | 12/2005 | Dai et al. |
| 2006/0020700 | A1 | 1/2006 | Qiu et al. |
| 2006/0031518 | A1 | 2/2006 | Jennings |
| 2006/0036904 | A1 | 2/2006 | Yang |
| 2006/0041606 | A1 | 2/2006 | Sawdon |
| 2006/0048224 | A1 | 3/2006 | Duncan et al. |
| 2006/0059112 | A1* | 3/2006 | Cheng et al. ............... 706/12 |
| 2006/0062161 | A1 | 3/2006 | Tang et al. |
| 2006/0123005 | A1 | 6/2006 | Burnett et al. |
| 2006/0200434 | A1* | 9/2006 | Flinn et al. ............... 706/12 |
| 2007/0028171 | A1 | 2/2007 | MacLaurin |
| 2007/0115123 | A1 | 5/2007 | Roberts et al. |
| 2007/0136572 | A1 | 6/2007 | Chen et al. |

FOREIGN PATENT DOCUMENTS

| | | | |
|---|---|---|---|
| EP | 1058429 | A1 | 12/2000 |
| EP | 1376309 | A2 | 1/2004 |
| EP | 1524580 | A2 | 4/2005 |
| EP | 1564622 | A2 | 8/2005 |
| JP | 2001282634 | A | 10/2001 |
| KR | 1020040038271 | A | 5/2004 |
| KR | 1020040107152 | A | 12/2004 |
| KR | 1020060057563 | A | 5/2006 |
| WO | WO0008814 | A1 | 2/2000 |
| WO | WO2004002107 | A1 | 12/2003 |
| WO | 2005022826 | | 3/2005 |

OTHER PUBLICATIONS

Brunner, et al. "Disruption Tolerant Networking" Dagstuhl Seminar Proceedings (2005) NEC Europe Ltd., Network Labooratories, 4 pages.

Fox, et al. "Towards Flexible Messaging for SOAP Based Services" (2004) IEEE, 11 pages.

Gunduz, et al. "A Framework for Aggregating Network Performance in Distributed Brokering Systems" (2000) Deptartment of Electrical Engineering & Computer Science, Syracuse University, 11 pages.

Chekuri, et al. "Building Edge-Failure Resilient Networks" (2002) Lucent Bell Labs, 18 pages.

Hota, et al. "Restoration of Virtual Private Networks with QoS Guarantees in the Pipe Model" (2004) GESTS International Transaction on Computer Science and Engineering, vol. 6 and No. 1, Journal ISSN No. 1738-6438, 12 pages.

Brightwell, et al. "Reserving Resilient Capacity in a Network" (2003) Networks 41, No. 2, 20 pages.

Duffield, et al. "A Flexible Model for Resource Management in Virtual Private Networks" (1999) ACM SIGCOMM Computer Communication Review vol. 29, Issue 4, 14 pages.

Create Buzz Marketing & Word of Mouth Marketing Campaigns. 2004-2005 Buzzoodle, A Liquid Learning Inc. Company. http://www.buzzoodle.com. Last accessed Sep. 20, 2006.

Seth Godin. Unleashing the Ideavirus. Do You Zoom, Inc., 2000.

James Surowiecki. The Wisdom of Crowds. Doubleday, 2004.

Sandhu, et al. Access Control: Principles and Practice. IEEE Communications Magazine, Sep. 1994.

System Management Concepts: Operating System and Devices, http://www.dlib.indiana.edu/doc_link/en_US/a_doc_lib/aixbman/admnconc/audit.htm. Last accessed Sep. 20, 2006.

Hughes, et al. Automated Verification of Access Control Policies. http://www.cs.ucsb.edu/~bultan/publications/tech-report04.pdf. Last accessed Sep. 20, 2006.

Cederquist, et al. An Audit Logic for Accountability. 2005. http://www.citebase.org/fulltext?format=application/ pdf &identifier=oai:arXiv.org:cs/0502091. Last accessed Sep. 20, 2006.

International Search Report for PCT US2007/079598 dated Jan. 30, 2008, 10 pages.

OA dated Jan. 26, 2009 for U.S. Appl. No. 11/536,449, 34 pages.

* cited by examiner

MACHINE LEARNING SYSTEM AND METHOD COMPRISING SEGREGATOR CONVERGENCE AND RECOGNITION COMPONENTS TO DETERMINE THE EXISTENCE OF POSSIBLE TAGGING DATA TRENDS AND IDENTIFY THAT PREDETERMINED CONVERGENCE CRITERIA HAVE BEEN MET OR ESTABLISH CRITERIA FOR TAXONOMY PURPOSE THEN RECOGNIZE ITEMS BASED ON AN AGGREGATE OF USER TAGGING BEHAVIOR

CROSS REFERENCE TO RELATED APPLICATION

This application is a continuation-in-part of U.S. application Ser. No. 11/536,462 filed on 28 Sep. 2006, entitled "USING TAGS FOR MACHINE LEARNING"—the entirety of which is incorporated herein by reference.

BACKGROUND

Massive amounts of storage space available to general consumers have enabled them to retain thousands, if not millions of files and items. For example, photographs taken via a digital camera can be transferred and stored on computing devices, and such computing device can subsequently be employed as a photograph album. Likewise, digital music files can be placed upon the computing device, and enable the computing device to further operate as a juke box.

Typically, items can be tagged based on user preferences, wherein tags are used to organize and identify relevant websites, articles and other data objects—(e.g., web users tagging photos based on familial relations, vacation categories, and the like). Accordingly, such tagging enables users to classify data objects, both for individual use and for collective use (e.g., by other Internet users.)

File organization can be facilitated via folders and subfolder creation, wherein names and location within a hierarchy of folders are determined according to topic and content that are to be retained therein. Such can be done manually and/or automatically; for instance, a user can manually create a folder, name the folder, and place the folder in a desired location. Thereafter, the user can move data/files to such folder and/or cause newly created data/files to be saved in such folder. Folders can also be created automatically through one or more programs. For example, digital cameras typically store files in folders that are named by date—thus, digital photographs can be stored in a folder that is based on a date that photographs therein were taken. Such approach works efficiently for a small number of files created over a relatively short time frame, as users can remember locations of folders and contents that were stored therein.

Nonetheless, when the number of files and folders increase, complexities can arise, such as for example: remembering where items to be retrieved are located, associated names, and the like. A search for file content or name can be employed, yet this search can be deficient in locating desired data, as a user may not remember the search parameters (e.g., not remembering name of a file, date when such file was created, and the like.) Additional problems can arise wherein, a file can be related to a particular topic, yet a search function cannot be employed due to lack of content or lack of particular wording. For example, a user may wish to locate each digital photograph that includes a certain family member, but the only manner to search for photographs can be through file name and date of creation, which the user does not recall; hence, the photograph cannot be accessed.

Data or files can be associated with additional metadata, hereinafter referred to as tags. For example, a user can tag a photograph with names of individuals who are in such photograph. Thus, upon performing a search for the name of a family member, each file that has been tagged with such name can be readily supplied to the user. Likewise for e-mail exchange and organization, e-mails can contain reference to particular criteria. For example, student emails can contain data content that associates such e-mail with a professor, while not including data relating to a university that employs the professor.

The user can also associate the email with the university by tagging the email with the university name—thus, a subsequent search of emails for the university can retrieve these items. Nonetheless, such manual approach for tagging proves to be unproductive. In general the user must select one or more items, and then manually create a desired tag. Yet, if thousands of items exist, such approach is inefficient and tedious for users.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation provides for recognition training of data based on analyzing aggregated tagging behavior of users, and evaluating convergence of such tagging trends, via employing a segregator component and a convergence component. The segregator component can initially determine existence of a possible trend of tagging data based on collective user behavior (e.g., extraction of metadata derived from analysis of content, to establish trend), and the convergence component can analyze such tagging trends to identify that a predetermined convergence criteria has in fact been met, and/or establish such criteria for taxonomy applications. Accordingly, tagging trends are analyzed in order to group items that have some sort of possible relations into one or more sets of related indexes based on aggregated behavior for a plurality of users. Subsequently, such possible relationships/indexes are further examined to determine whether they in fact converge, to designate criteria and/or determine satisfaction of predetermined thresholds that are set for taxonomy purposes. Hence, rather than expecting user(s) to adhere to a predefined set of hierarchical categories, the system allows discovery of relations among individual/collective user(s). By leveraging the relationships and/or behavioral characteristics (e.g., calculation of importance tags with respect to a focus tag that exist in "tag-space"), the subject innovation can discover content that is related to each other, in ways that make sense to the users of the content itself.

In a related aspect, a recognition component can further employ such discovered user trends during tagging, to train a machine learning engine for recognition of the items being tagged. For example, by analyzing world wide tagging trends of Internet users (who are literally annotating the web with additional meta-information regarding tagged items), tagging trends can be exploited to improve machine learning algorithms for item recognition.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
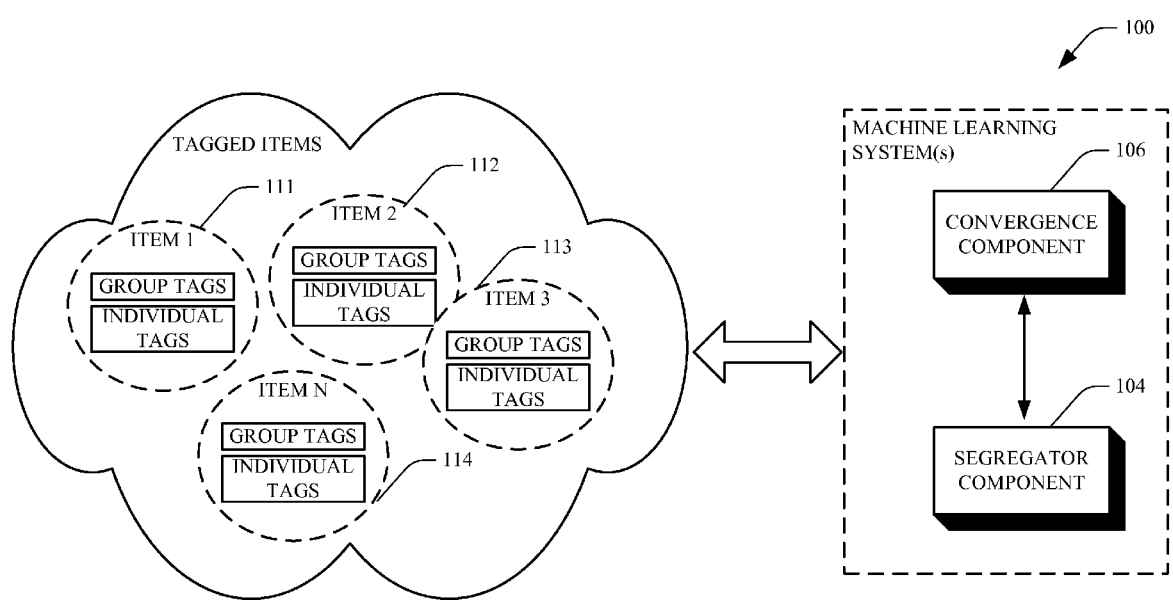
FIG. 1 illustrates a block diagram of an exemplary system that analyzes aggregated tagging behavior of users, and further converges a plurality of tagging indexes to identify criteria for taxonomy applications, in accordance with an aspect of the subject innovation.

FIG. 1 illustrates a system 100 that analyzes aggregated tagging behavior of users, and evaluates convergence of such tagging trends, to identify criteria for taxonomy applications via employing a segregator component 104 and a convergence component 106. As used herein, the term "tag" can refer to a user defined identifying indicia (e.g., keyword), which is applied to an item of content as metadata. The system 100 can employ such tags to provide for deducing taxonomy (e.g., for classification purposes) based on relationships of these tags and items. A data driven model of user tagging behavior can be employed, such as modeling items that are being tagged similarly by a plurality of users.

The segregator component 104 can initially determine existence of a trend for tagging data based on collective user behavior, among a plurality of items 111-114 (1 thru N, N being an integer.) The items 111-114 can be files, such as photographs, word processing files, spreadsheets, and the like, as well as web pages, emails, and any other suitable types of data items. Such items 111-114 can further include items of a substantially similar type or items of disparate types, and can be restricted based upon desired implementation. For example, the items 111-114 can reside within a computer, be associated with item a hard drive, a removable storage media, an application(s), and the like. At least some of the items 111-114 can also be related to the Internet or an intranet. For example, a web site(s) can be associated with a particular tag.

The segregator component 104 can analyze tags associated with a first selected item and thereafter locate other items that are associated with similar tags (e.g., items with content that corresponds to same tags). Moreover, content of the first selected item can be analyzed, and keywords can be created and/or extracted from the first item. Such keywords can subsequently be employed to locate other items that have an association to the keyword(s), and thus have a relation to the first item. In yet another example, relationships can be determined based upon location of items within a computer, item type, date of creation of items, and the like. As another example, keyword extraction techniques can be employed upon each item within the set of related items, and a threshold number of keywords that are at least somewhat common across the items within the set of related items can be utilized as tags for each item within the set.

Moreover, the convergence component 106 can analyze tagging trends (e.g., extraction of metadata derived from analysis of content for establishing trend) to identify that a predetermined convergence criteria has in fact been met, and/or establish such criteria for taxonomy applications. Hence, algorithmically-deduced relationships between items based on user applied tags can be determined. The system 100 can employ such tags to allow for deducing taxonomy (e.g., for classification purposes) based on the relationships of these tags and items (e.g., posts).

Thus, rather than expecting user(s) to adhere to a predefined set of hierarchical categories, the system 100 allows discovery of relations among individual/collective user(s). By leveraging the relationships that exist in "tag-space" in unique ways, the subject innovation can discover content that is related to each other (e.g., in a way that makes sense to the users of the content itself). Based, at least in part, upon the tagged content and user behavior relationships between items (e.g., creating a pseudo-hierarchy), trends can be discovered and examined to verify whether they in fact converge, hence identifying a criteria for taxonomy purposes. Moreover, collective behavior of users interacting with tagging can be interpreted, for such identification, wherein the system can adapt to changing user behavior patterns. It is to be appreciated that users can tag the same item in different ways, and such item will subsequently appear under a plurality of tagging trends.

Figure 2:
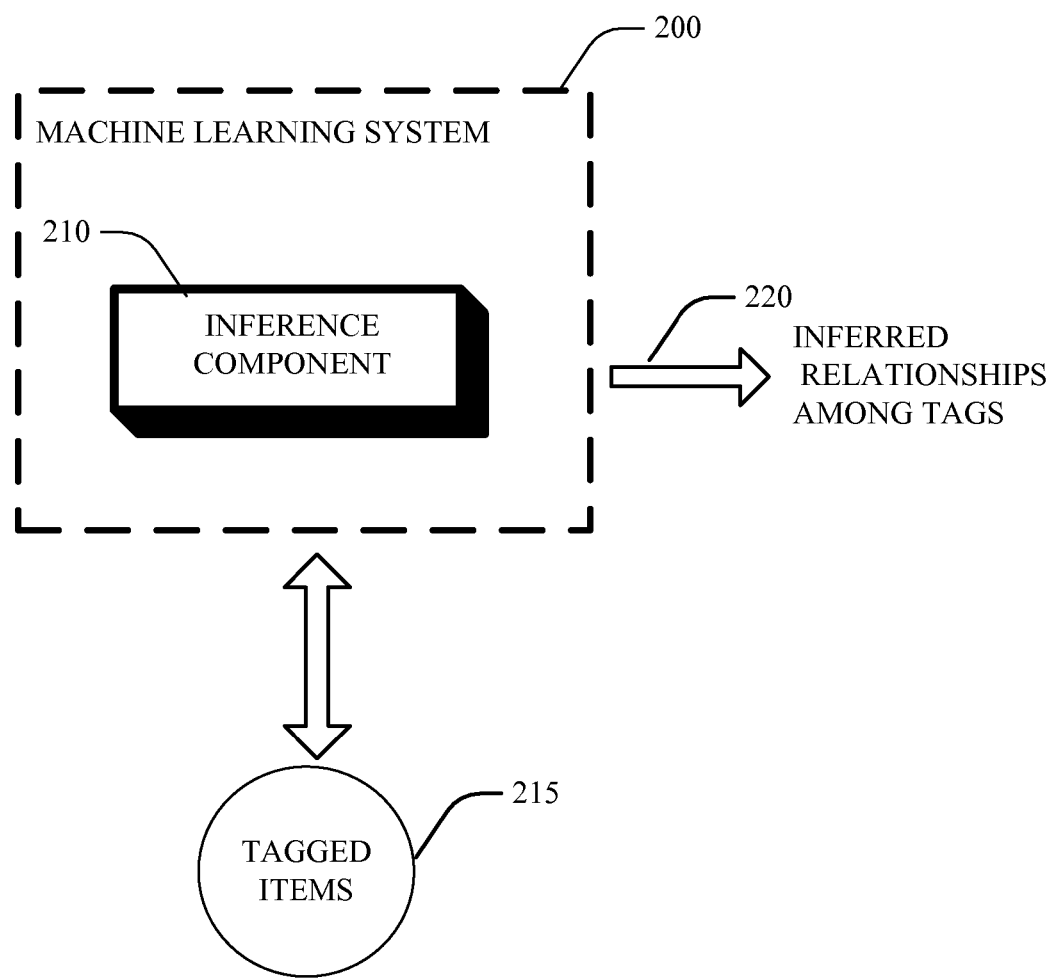
FIG. 2 illustrates a particular machine learning system with an inference component in accordance with an aspect of the subject innovation.

FIG. 2 illustrates a machine learning system 200 that has an inference component 210 in accordance with an aspect of the subject innovation. The system 200 infers relationship 220 between tagged items 215. Thus, rather than expecting user(s) to adhere to a predefined set of hierarchical categories, the system 200 allows inferring tagging behavior of user(s), to facilitate taxonomy. As explained earlier, by leveraging the relationships that exist in "tag-space" in unique ways, users can discover content that is related to each other (e.g., in a way that makes sense to the users of the content itself).

The inference component 210 can employ one or more algorithms in order to infer possible relationships between tagged items 215. For example, the inference component 210 can employ an algorithm that scores each potential tagging trend for auto suggesting by assigning a "point" for each time, an item that has been employed with such tagging trend (e.g., one of the tags currently attached to a focus item such as coincident tag(s) is tagged accordingly by a user.) Tagging trends with the highest number of points can be considered the "best" tags for auto suggestion of trends, for example. Selecting the list of potential tagging trends, and which ones are likely auto suggests can be accomplished by employing statistical analysis. For example, calculations on the number of standard deviations away from the statistical mean, where item(s) more than two standard deviations away, can be employed for auto suggesting a tagging trend based on collective behavior of users. Such algorithm can be designated as a possible tagging trend, and provide users with a way to browse very popular and potentially relevant item(s).

In another example, the inference component 210 can employ a Bayesian classifier style of categorization. Accordingly, the inference component 210 typically computes the probability of an item associated with a tag from a plurality of tagging behavior by users. The inference component 210 can employ the probabilities to suggest inferred relationships among tags. In yet a further related example, the inference component 210 can score each potential tagging trend for auto suggestion by assigning it a point for each time, such tagging trend has been used by a user. Tagging trends with the highest number of points can be considered suitable for auto suggestion. It is to be appreciated that the inference component 210 can employ any appropriate inference algorithm for inferring relationship between tagged items 215, and any such algorithm is within the realm of the subject innovation. Moreover, the inference component 210 can, optionally, receive user feedback with respect to the inferred relationship(s), as described in detail infra. The inference component 210 can also employ feedback when inferring relationship (e.g. adapt an inference model). The inference component 210 can also facilitate tag generation based on what the system already knows—(in addition to user behavior)—about context of tagging activities. Information such as: geographic location of user (GPS information), events scheduled in user's calendar, news, current events, colors and faces in a digital photograph, voices detected in the media, music playing the background, and the like, can also be employed by inference component 210 to facilitate inferring relationships/tag generation, for example. It is to be appreciated that new tags and/or relationships can also automatically be created without typically user input based compiling metadata (beyond plurality of users and aggregated behavior.)

In a related aspect, artificial intelligence (AI) components can be employed to facilitate analyzing aggregated tagging behavior of users and converging a plurality of tagging indexes to identify criteria for taxonomy applications. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 3:
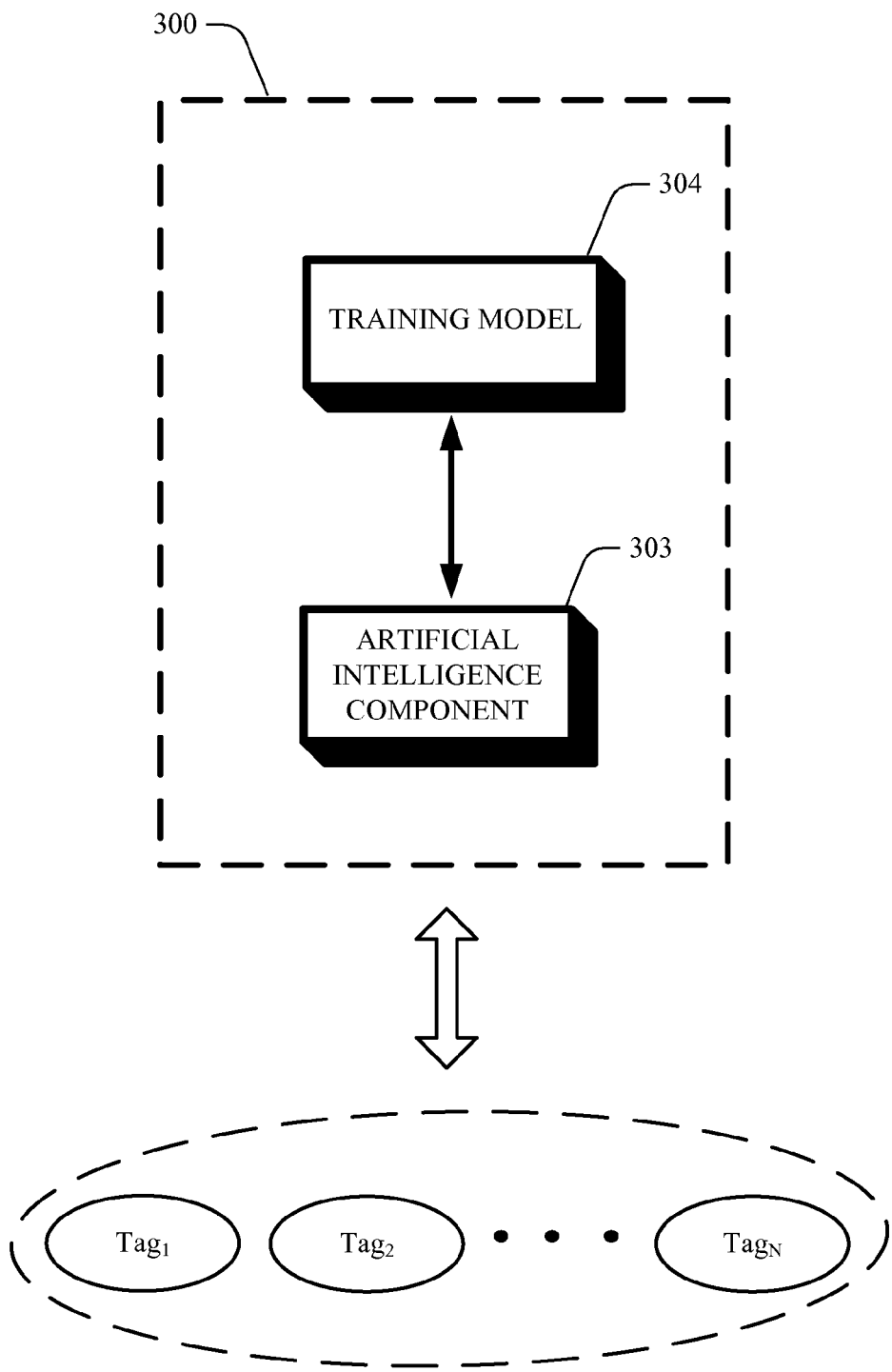
FIG. 3 illustrates machine learning system with an artificial intelligence component that can interact with a training model to infer a tagging behavior from a plurality of users.

FIG. 3 illustrates a machine learning system 300 that incorporates an artificial intelligence component 303 in conjunction with a training model 304, in accordance with an aspect of the subject innovation. For example, a process for determining the tagging trends can be facilitated via an automatic classifier system and process. A classifier is a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, and the like.)

The system 300 can facilitate an automatic interpretation for user preference (e.g., a collective behavior of web users, when tagging data.) Such preferences can then be employed as part of taxonomy applications, which are usually based on how the data is to be stored and/or classified. By exploiting the aggregate behavior of users (e.g., not treating each user as an individual expert) the subject innovation can mitigate noise, and generate relevance judgments from user behavior and/or feedback of users. Examples of behavioral characteristics can include quantity of coincident tags, calculation of importance tags with respect to a focus tag, and the like. Thus, rather than expecting user(s) to adhere to a predefined set of hierarchical categories, the system allows user(s) to view those item(s) that are "more" or "less" like the current context they are viewing. The system can thus enhance the browsing capability, and therefore, discoverability of content. By leveraging the relationships that exist in "tag-space", users can discover content that is related to each other (e.g., in a way that makes sense to the users of the content itself).

For example, data collected from the web can be initially segregated to identify possible tagging trends based on type of item. Tagging trends can then be analyzed in order to group items that have a relationship into one or more sets of related indexes based on the aggregate user behavior. Subsequently, such possible relationships/indexes are further examined to determine whether they in fact converge and utilized to designate criteria for taxonomy purposes.

Figure 4:
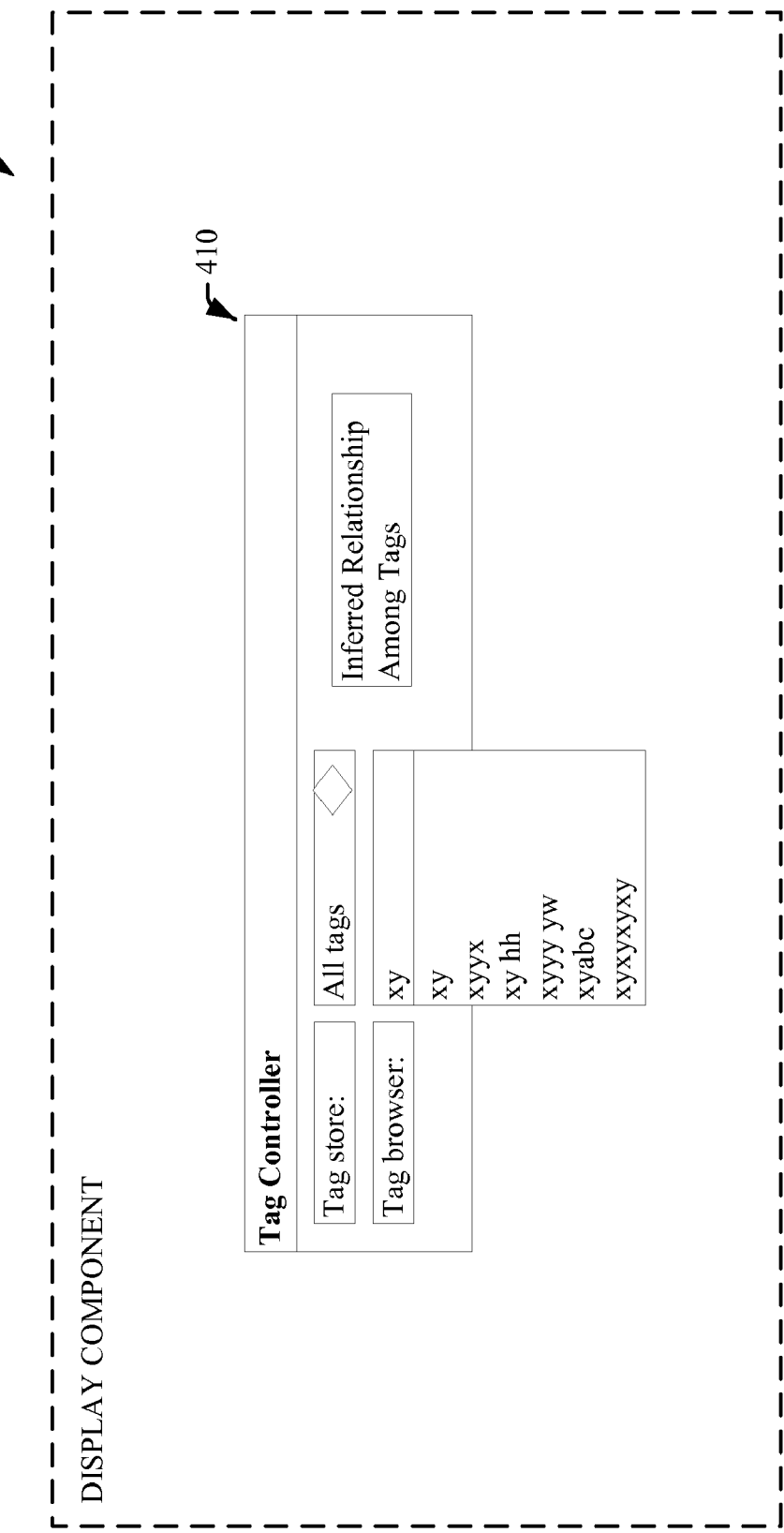
FIG. 4 illustrates an exemplary display component that displays a plurality of inferred relationships among tags to users, according to an aspect of the subject innovation.

FIG. 4 illustrates an exemplary display component 400 that displays a plurality of inferred relationships among tags to users. The display component 400 can further display one or more tags that were found to be associated with a plurality of items via the segregator component. For example, an item can be associated with a tag that employs a similarity score to compare such item to a set of related items. If the similarity score between a plurality of tags and a tag for an item selected by a user is within a defined threshold, such tags can be analyzed to determine tagging trends (e.g., extraction of metadata derived from analysis of content for establishing trend) to identify that a predetermined convergence criteria has in fact been met, and/or establish such criteria for taxonomy applications.

Typically items that are associated with a tagging trend/selected tag can be displayed. A user can select an inferred relationship for tags displayed by the display component 400, relationship among items within set(s) of items that are associated with a tag selected by the user can be provided thereto. Such items can include word processing documents, web pages, spreadsheets, digital photographs, and any other suitable item. Accordingly, a user can readily locate items associated with tags, and in general employ relationships inferred through collective behavior of users, when tagging items, to formulate taxonomy classification. The user interface 400 can further include a tag controller 410, to select tags and to adjust how closely related to a center context, such as selected relationships and/or a focus tag for displayed results are to be included (e.g., a threshold for inferred relationships to be displayed). Thus, with the user interface 400, the user can re-center their context—e.g., select a particular tag as the "new" focus and narrow and/or widen the scope of the tag sets directly on the display to allow a more or less narrowly focused scope/inferred relationship.

Figure 5:
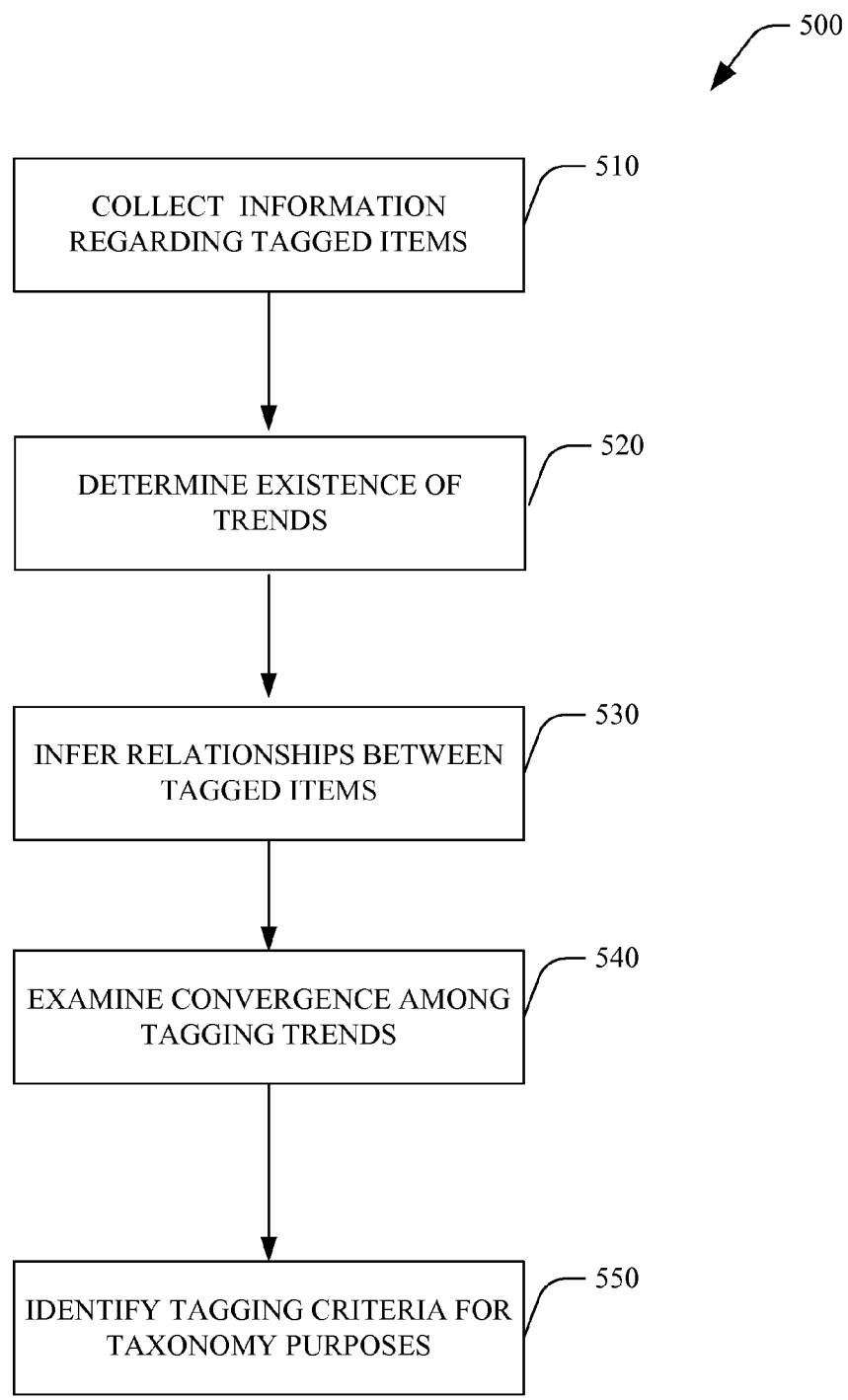
FIG. 5 illustrates a particular methodology for inferring tagging behavior for a plurality of users in accordance with an aspect of the subject innovation.

FIG. 5 illustrates a related methodology 500 for inferring tagging behavior of tagging in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. As illustrated by the tagged content inference method 500, initially and at 510, information regarding items that are tagged via a plurality of users is collected. Next, and at 520 a determination is performed to verify existence of trends among tags and associated items. Such determinations can be supplied via predetermined criteria and/or based on discovered inferences at 530 and as described in detail supra. Subsequently, and at 540 tagging trends are examined (e.g. extraction of metadata derived from analysis of tagged content for establishing trend) to identify that a predetermined convergence criteria has in fact been met, and/or establish such criteria for taxonomy applications (e.g., via various statistical/probabilistic methods.) Next, and at 550 a criteria can be identified for taxonomy purposes.

Figure 6:
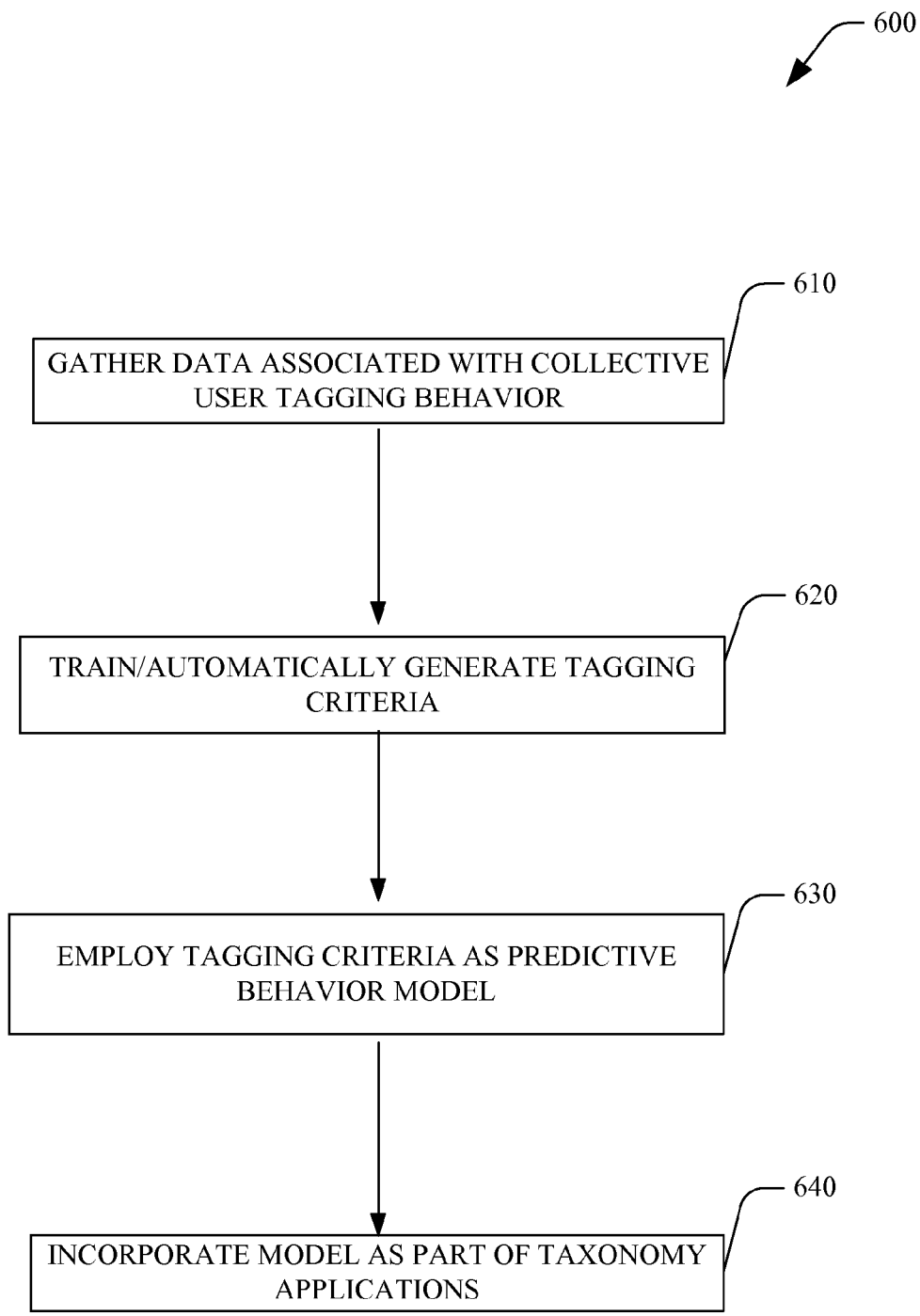
FIG. 6 illustrates a related methodology of inferring tagging trends based on type of item, and based on aggregate user behavior, in accordance with an aspect of the subject innovation.

FIG. 6 illustrates a related methodology 600 for determining possible tagging trends based on type of item, and further based on aggregate user behavior, in accordance with an aspect of the subject innovation. Initially, and at 610, data related to collective tagging behavior of users can be gathered. Subsequently and at 620, such user behavior can then be employed to train or automatically generate a tagging criteria (e.g., a model.) Next, and at 630 the tagging criteria can be established as a predictive behavior model for future tagging actions of users. Such tagging criteria can also be incorporated to define categorization criteria as part of taxonomy applications, at 640.

Figure 7:
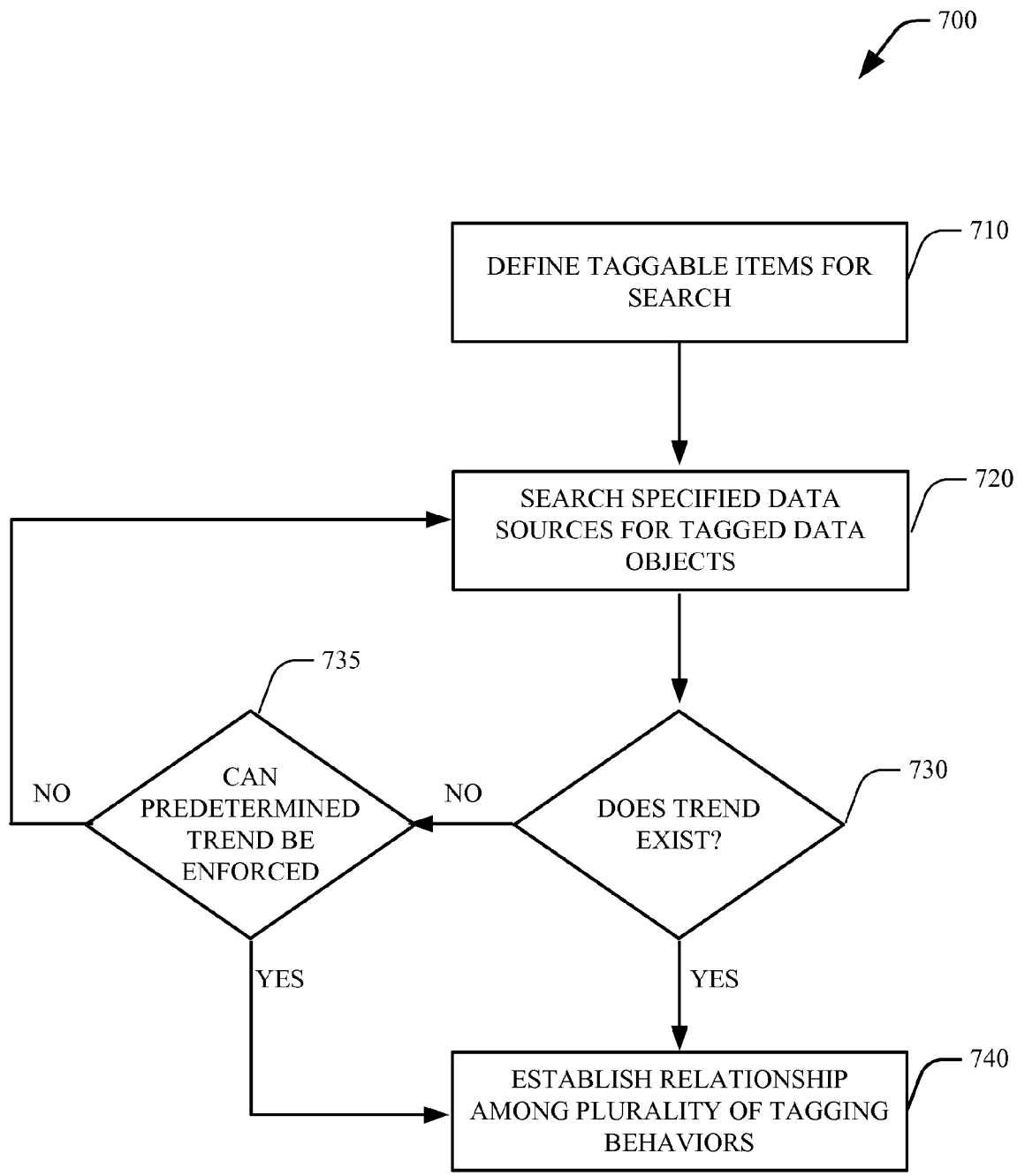
FIG. 7 illustrates a methodology of continuously or periodically searching data sources, and reporting tags associated with items to a machine learning system in accordance with the subject invention.

FIG. 7 illustrates a methodology 700 for continually or periodically searching data sources and reporting tags associated with items to a machine learning system in accordance with the subject invention. The machine learning system can subsequently supply a tagged content inference to facilitate taxonomy applications and browsing of data/content with a pseudo-hierarchical feel using algorithmically-deduced relationships between items based on user applied "tags" (e.g., a user defined keyword that is applied to a piece of content as metadata).

Initially and at 710, search parameters that relate to taggable items can be defined. The users can specify one or more tags, the type of data object (e.g., text file or image file), data sources to be searched, and other search parameters. In addition, such user can also specify the frequency with which the search is to be repeated, and a date or time at which the search can expire. Next and at 720, the specified data sources can be searched for data objects that meet the search parameters. The results of the search are supplied to the machine learning system of the subject innovation.

The results of such search can include the data objects that meet the search parameters, thumbnails or other representations of the data objects, or links to the data objects. Next, and at 730, a determination is made whether a trend and/or relationship exists. If so, the methodology 700 proceeds to act 740 wherein a plurality of tagging behaviors is established. Otherwise and at 735, a determination is made whether a relationship can be forced among the plurality of tagging behavior of users (e.g., predetermined convergence criteria can be obtained). If so, the relationship among a plurality of tagging behaviors is established at 740. Otherwise, the methodology returns to 720 as no trend can be forced among the plurality of users and tagging behavior, for example.

Figure 8:
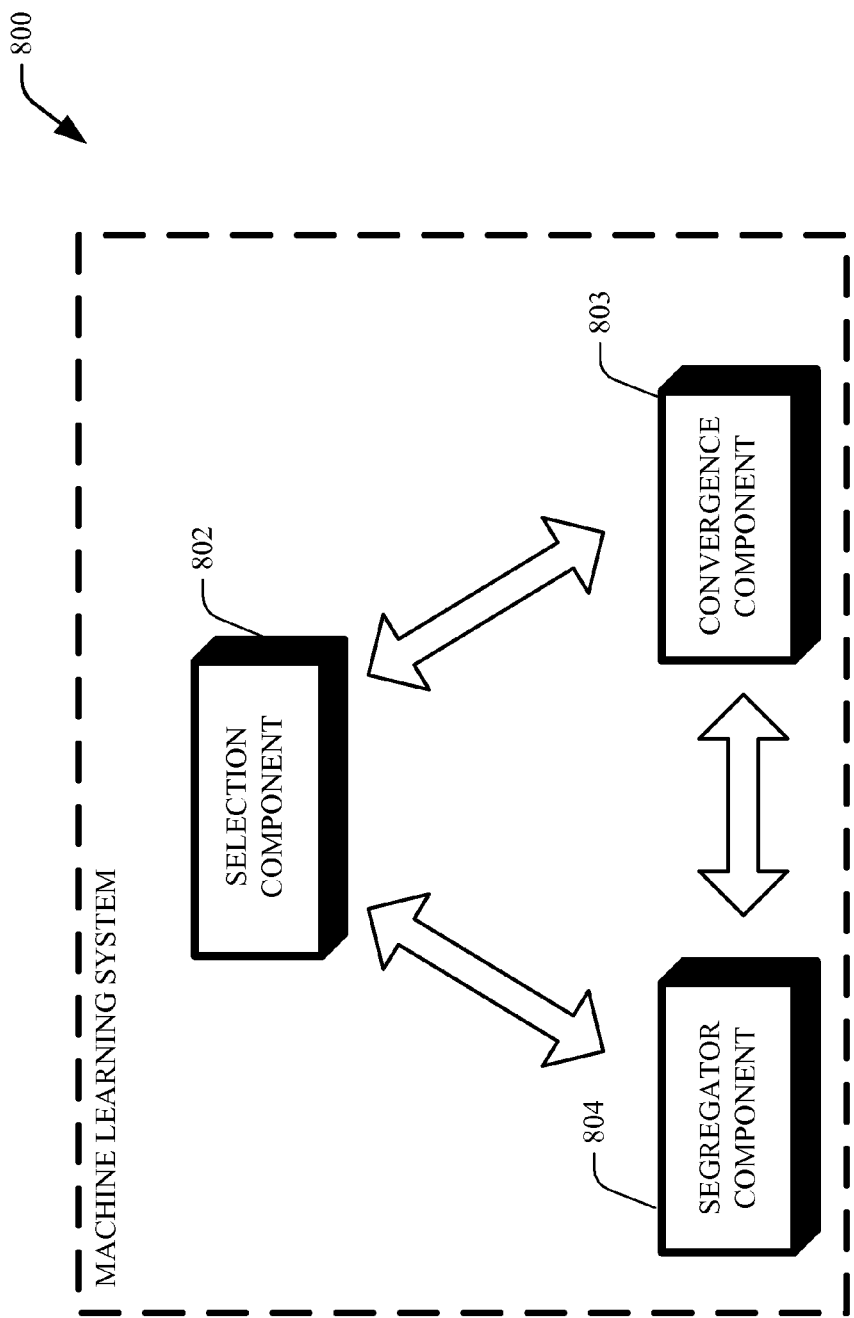
FIG. 8 illustrates a machine learning system that facilitates automatically recognizing trends among a group of items and associated tags, as part of collective behavior of users, according to an aspect of the subject innovation.

FIG. 8 illustrates a system 800 that facilitates automatically recognizing trends among a group of items and associated tags, as part of collective behavior of users. The system 800 can include a selection component 802 that is employed to select one or more items and associated tags within the plurality of items. Such selection is performed in connection with trend identification and grouping of items and associated tags into a set(s) of identified relationships. For example, the selection component 802 can automatically loop through each item within the plurality of items in connection with trend identification and grouping the items/tags. In another example, the selection component 802 can select one or more items within the plurality of items given user commands. In a related example, the items can be selected via pointing and clicking mechanism, one or more keystrokes, a microphone and associated software (for receipt and implementation of voice commands), a pressure-sensitive screen, any other suitable mechanism that facilitates selection, or any combination thereof. The selection component 802 can be associated with the segregator component 804 that aids in grouping or clustering items into the set of items and/or relationships. For example, the segregator component 804 can analyze features associated with each selected item, and can extract or create keywords, phrases, or other data, based at least in part upon content of the selected item(s). For instance, if a selected item is a document, the segregator component 804 can extract keywords or phrases from the selected item. The segregator component 804 can initially determine existence of a trend of tagging data based on collective user behavior.

In a related example, a selected item can be an email, and the segregator component 804 can extract keywords or phrases from such email. Furthermore, the segregator component 804 can weight particular portions of the email in connection with extracting keywords or phrases. For instance, words or phrases that appear in a "subject" line can be provided a greater weight than words or phrases that appear in a body of a message.

In yet another example, a selected item can be a digital image, and the segregator component 804 can analyze the digital image to extract features therefrom. For instance, the segregator component 804 can extract data relating to facial features of individuals from within the image, create a color chart with respect to the image, or any other suitable data analysis. Moreover, machine learning systems (implicitly as well as explicitly trained) can subsequently be trained based on results for such analysis. Moreover, interactions of users with the items can be facilitated based on indexes/trends that are derived initially from the aggregate behavior of other users. For example, a tagged content inference system can be provided to facilitate browsing of data/content with a pseudo-hierarchical feel via employing algorithmically-deduced relationships between items based on user applied tags (e.g., a user defined keyword that is applied to a piece of content as metadata).

Inferring relationships for tagging behavior of users can be supplied by the segregator component 804, by analyzing collective tagging behavior related to matters, such as: name of the selected item, data and time of creation of the selected item, location of the selected item within an electronic storage media, type of item, name of an individual creating the file, tags assigned to the selected item, an identity of a sender of an email, identities of other individuals in a "To" field of an email, identities of individuals in a "Cc" field, all or part of an IP address, a domain name, and any other suitable data that may be associated with items.

For example, the segregator component 804 can locate all items within the plurality of items that have similar words in their name when compared to a selected item, were created at similar times when compared to a selected item, and the like. Similarly, in an example relating to digital images, each image that includes a particular individual can be placed within the set of items by the segregator component 804. Thus, the segregator component 804 can undertake any suitable operation in creating the set of such items based at least in part upon the analysis of selected items undertaken by the segregator component 804.

As stated above, the selection component 802 can loop through items within the plurality of items—for example, each item can be analyzed by the segregator component 804, and the results of such analysis can be provided to the convergence component 803 to analyze tagging trends (e.g., extraction of metadata derived from analysis of content for establishing trend) to identify that a predetermined convergence criteria has in fact been met, and/or establish such criteria for taxonomy applications.

The selection component 802 can automatically select items in a predefined, random, and/or pseudorandom order. Furthermore, such selection component 802 can select items based upon time of creation, location of the items, name, or any other suitable manner for selecting the items. Looping through each item within the plurality of items can evaluate and/or ensure that each item is associated with at least one group of items. In another example, each time that an item is selected by a user such item can be provided to the segregator component 804. Thus, a selected item will be placed within one or more groups of items.

Figure 9:
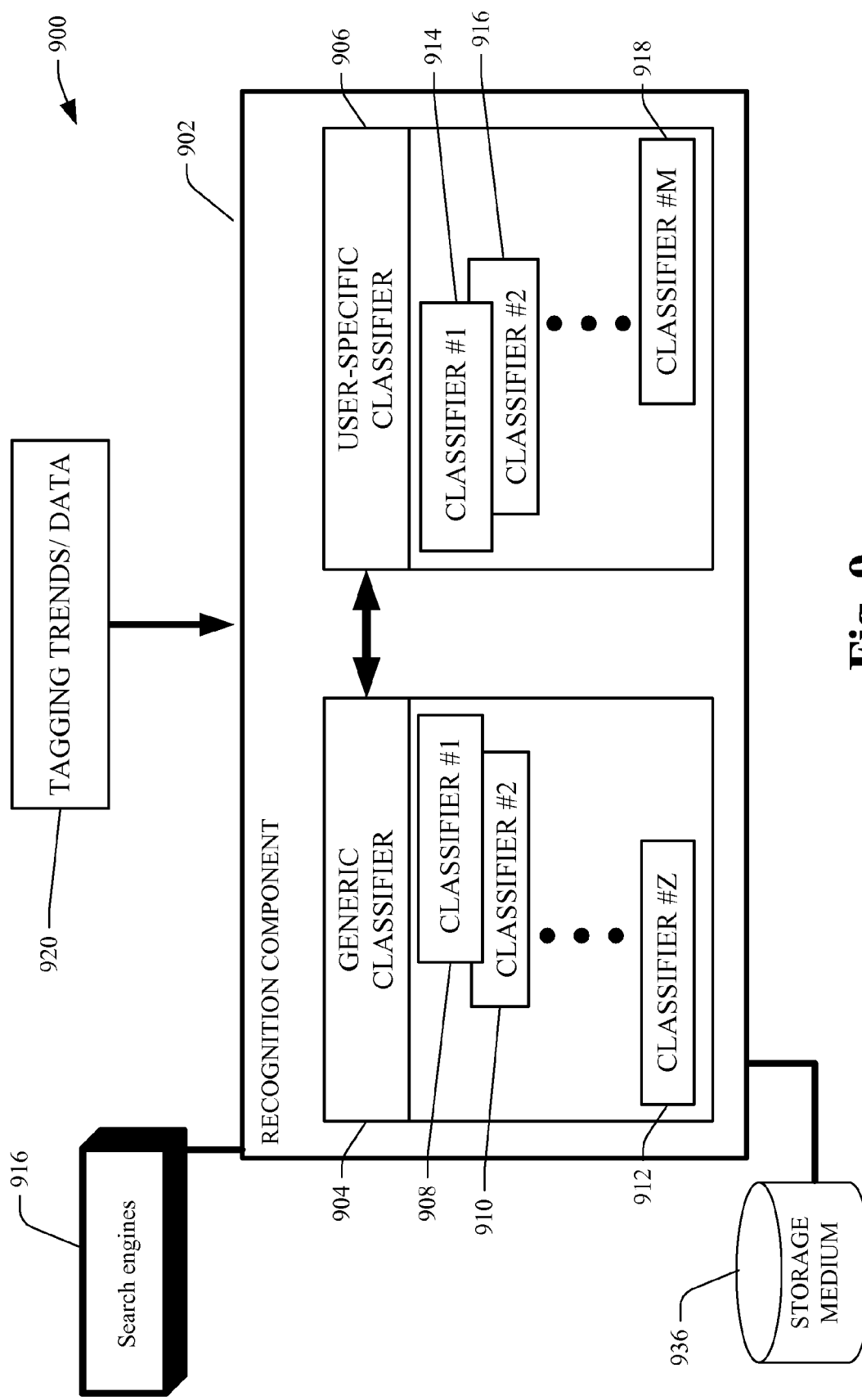
FIG. 9 illustrates a system for recognizing items that are tagged by users in accordance with an aspect of the subject innovation.

FIG. 9 illustrates a recognition system 900 that can be trained to identify items tagged by users. The system 900 includes a recognition component 902 that can further employ such discovered user trends 920 during tagging, to train the machine learning engine for item recognition. For example, the system 900 can enable photo recognition by analyzing world wide tagging trends of Internet users, who are annotating digital photos based on objects pictured therein. For instance, when a plurality of digital photos are tagged as "dog" pictures by different users, (e.g., 100,000 digital photos tagged as "dogs" throughout a network) such tagging trend can be employed to teach a machine learning system how a dog is represented in a digital photograph. Likewise, such machine learning system can be further trained to recognize special breed of dogs, (e.g., discern "beagles" based on user tagging behavior when tagging digital photos of beagles.) Accordingly, by analyzing an entire set of annotations performed by millions of users, machine learning algorithms can be improved. Similarly, and in addition to identifying correlations, web engines that are associated with such machine learning systems can also provide supplemental functions, such as for example: mitigating false positives, targeting advertising based on demographics associated with manually tagged content, error checking of trained models, creating easy to use tools to facilitate manual tagging, unify standard for manual tagging, and provide applications associated with such concepts.

The recognition component 902 can include a generic classifier component 904 and/or a user-specific classifier component 906. The generic classifier 904 can further include a plurality of classifiers #1-Z 908-912, (where Z is an integer). Likewise, the user-specific classifier component 906 can include user-specific classifiers #1-M 914-918, (where M is an integer.) The recognition component 902 receives and analyzes tagging trends/data 920. The generic classifier component 904 and the user-specific classifier component 906 can be utilized in conjunction to facilitate analysis by the recognition component 902. In one aspect, the generic classifier component 904 is employed to provide classification of tagging trends/data that is substantially tagged similarly across users, and the user-specific classifier component 906 can be employed to facilitate in determining the classification of user-specific data and for predetermined grouping of users (e.g., tagging behavior by groups based on age, sex, and other demographics). Also, search engines 916 (e.g., crawlers) can be supplied with such system 900 and additional tagging relationships to facilitate enterprise management and search, for example. Moreover, community ratings and established resource relations can be employed for evaluating a user's trustworthiness and authority, when tagging items. The items that are such recognized and/or classified can then be stored in the storage medium 936. Thus, in addition to files/folder organization systems, users can benefit from non-hierarchical classifications (e.g., links, alternate hierarchy) when searching for data—such as implementing hierarchical tags (e.g., the Dewey Decimal System.)

Figure 10:
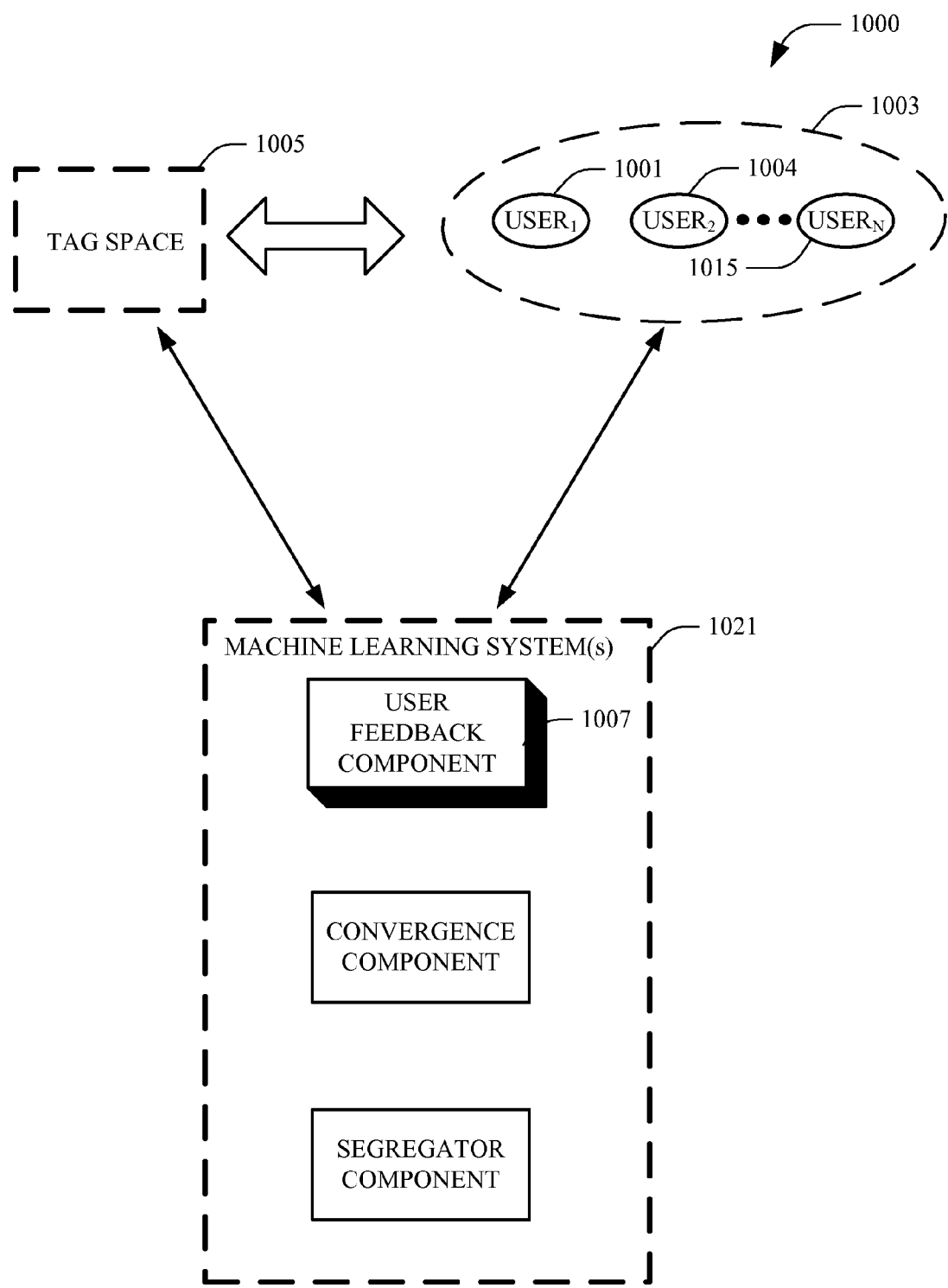
FIG. 10 illustrates an exemplary block diagram of a machine learning system that interacts with a user space and a tag space in accordance with an aspect of the subject innovation.

FIG. 10 illustrates a block diagram of a system 1000, with a machine learning system 1021 that interacts with a user space 1003 and a tag space 1005, to identify criteria for taxonomy applications in accordance with an exemplary aspect of the subject innovation. Initially a determination is performed on the tag space 1005 to evaluate existence of a trend for tagging data based on collective user behavior within the user space 1003, as explained in detail supra. Such evaluation via the machine learning system 1021 can further employ user feedback components 1007 that collect user feedback associated with tagging behavior of items (during different time periods), from a plurality of users, and hence supply collective tagging user behavior. The user feedback component 1007 can mitigate noise, (which typically can accompany individual user behavior, such as malicious and/or irrational user activity.) In general, by not treating each user 1001, 1004 and 1015 as an individual expert the system 1000 can generate relevance judgments from feedback of a plurality of users.

Accordingly, rather than expecting user(s) to adhere to a predefined set of hierarchical categories when tagging items, the machine learning system 1021 enables a dynamic inference of relationships—as collective user behavior when tagging items changes, then inferred relationships for tagging items changes. As explained earlier, by leveraging the relationships that exist in tag-space in unique ways, users can discover content that is related to each other (e.g., in a way that makes sense to the users of the content itself).

Figure 11:
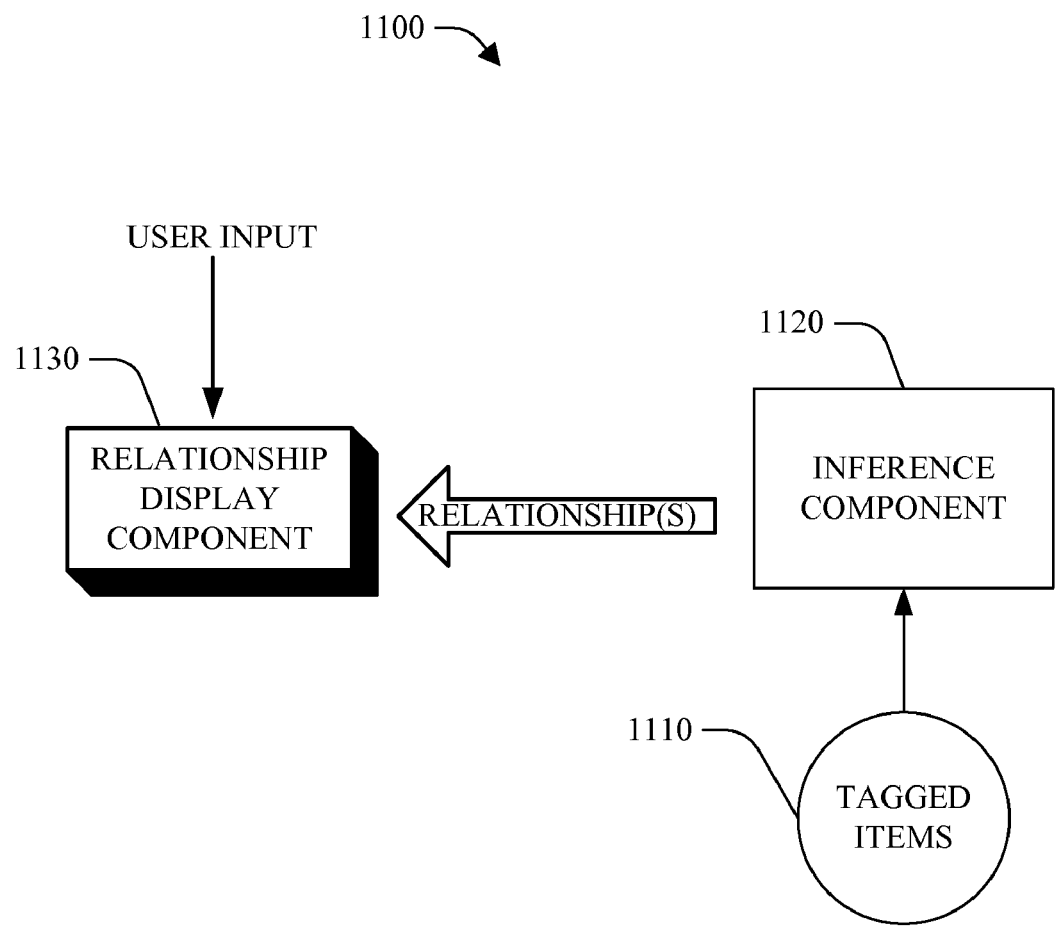
FIG. 11 illustrates a relationship display component that can display possible inferred relationships to a user of a machine learning system in accordance with an aspect of the subject innovation.

In a related aspect, and as illustrated in FIG. 11, the subject innovation can further employ a relationship display component 1130. The relationship display component 1130 can create a visual representation of inferred relationships among tagged items 1110 based on relationship(s) inferred by the inference component 1120. The visual representation can further be based in part upon: user input (e.g., predetermined relationships that can be forced among tags; threshold quantity of tags to be displayed, threshold strength of relationship, color settings, and the like.) For example the visual representation can choose to manually change an inferred tagging trend, and change the corresponding content presented. Moreover, the relationship component 1130 can further enable users to "dig down" into the inferred relationship/hierarchy, and/or to broaden the view as if moving to a higher hierarchy element.

As used in herein, the terms "component," "system" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 12:
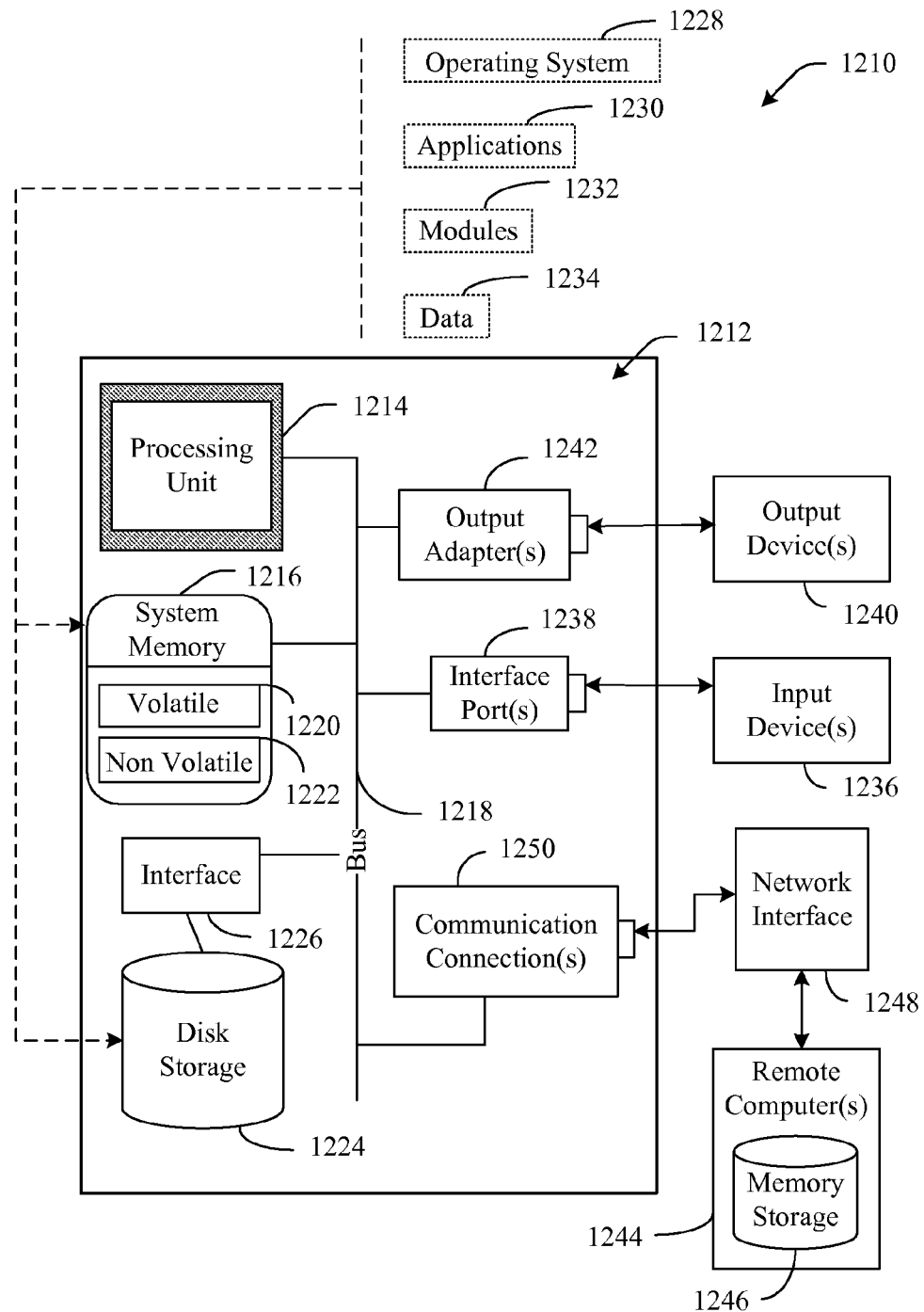
FIG. 12 illustrates an exemplary operating environment for implementing various aspects of the subject innovation.
Figure 13:
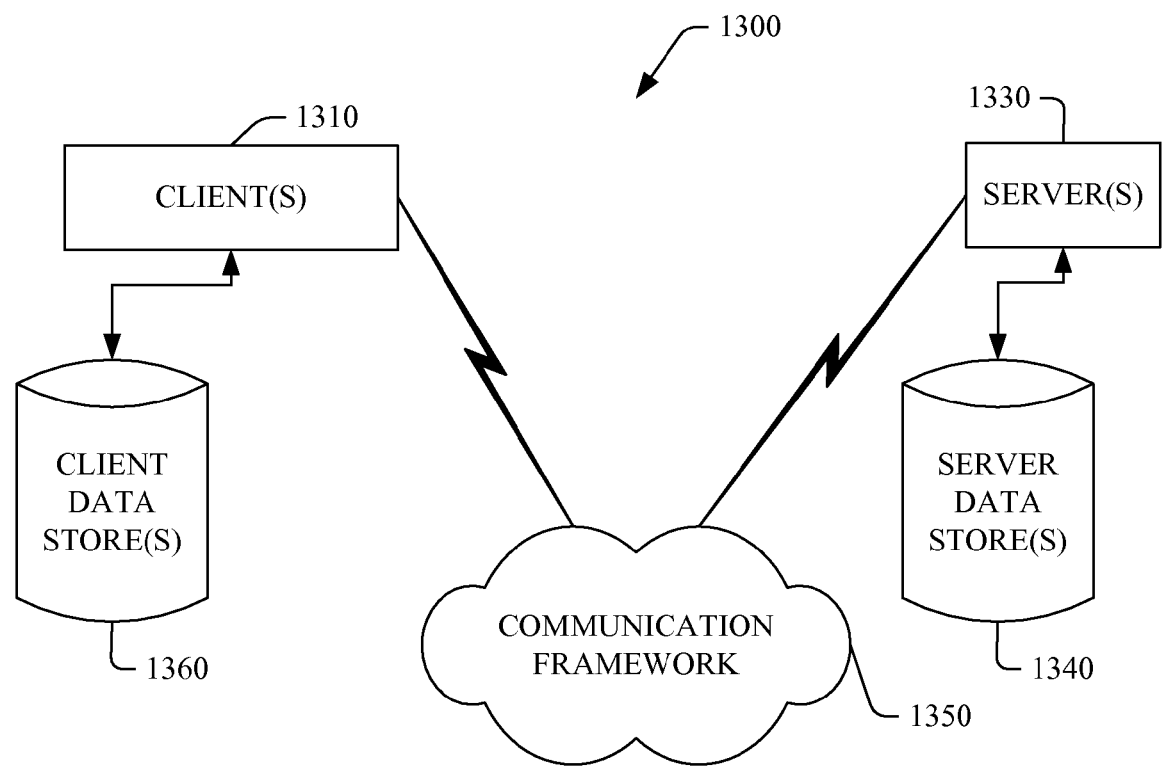
FIG. 13 illustrates a schematic block diagram of a sample computing environment with which the subject innovation can interact.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, etc. that perform particular tasks and/or implement particular abstract data types. Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 12, an exemplary environment 1210 for implementing various aspects of the subject innovation is described that includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-60 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that various components described herein can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample-computing environment 1300 that can be employed for analyzing aggregated tagging behavior of users. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g. threads, processes, computing devices). The servers 1330 can house threads to perform transformations by employing the components described herein, for example. One possible communication between a client 1310 and a server 1330 may be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine learning system that analyzes tagging behavior, comprising:
 a segregator component configured to initially perform a determination of an existence of a possible trend of tagging data based on collective user tagging behavior among a plurality of items, the determination including an extraction of one or more tags derived from analysis of the plurality of items to establish the possible trend;
 a convergence component configured to analyze the possible trend to identify that a predetermined convergence criteria has been met or to establish a criteria for taxonomy purpose based, at least in part, upon tagged items and user tagging behavior relationships between the plurality of items;
 a recognition component configured to recognize the plurality of items based on aggregate of user tagging behavior associated with the items; and
 a storage medium that stores recognized items.

2. The machine learning system of claim 1, the recognition component further comprising generic classifiers that classify tagged items based on aggregate of user tagging behavior.

3. The machine learning system of claim 1, the recognition component further comprising user specific classifier that is based on user demographics.

4. The machine learning system of claim 2 further comprising a search engine that searches for items based on classification.

5. The machine learning system of claim 4 further comprising a Dewey Decimal System that facilitates data organization based on hierarchical tags.

6. The machine learning system of claim 1 further comprising a training model for determination of tagging trends.

7. The machine learning system of claim 3 further comprising an artificial intelligence component that facilitates trend establishment among tagged items, the tagged items including at least one of digital photographs, e-mails, web pages, and data files.

8. The machine learning system of claim 1, further comprising a display component having a tag controller that sets thresholds for trend establishment.

9. The machine learning system of claim 4 further comprising a Bayesian classifier.

10. The machine learning system of claim 1 further comprising a user feed back component that collects user feedback associated with tagging behavior of items.

11. A method of inferring tagging behavior comprising:
 collecting, by a machine learning system configured to recognize items via tagging behavior, relationships established by a plurality of users when tagging items;
 displaying, by the machine learning system, an interface to a user to select one or more tags and to adjust how closely the one or more tags relate to a relationship; and
 recognizing, by the machine learning system, the items based on tagging behavior of users.

12. The method of claim 11 further comprising evaluating, by the machine learning system, a trustworthiness of a user based on relationships established thereby.

13. The method of claim 11 further comprising inferring, by the machine learning system, relationships among tags.

14. The method of claim 11 further comprising organizing, by the machine learning system, items based on tagging behavior of the plurality of users.

15. The method of claim 11 further comprising browsing, by the machine learning system, data based on algorithmically-deduced relationships between items.

16. The method of claim 11 further comprising searching, by the machine learning system, for items based on the tagging behavior of users.

17. The method of claim 11 further comprising training, by the machine learning system, a machine learning system for inferring tagging behavior of users.

18. The method of claim 11 further comprising automatically generating, by the machine learning system, possible tagging criteria.

19. The method of claim 11 further comprising incorporating, by the machine learning system, inferred tagging criteria in taxonomy applications.

20. A computer storage medium encoded with processor-executable instructions that, when executed, direct a computing system to perform a method, the method comprising:
 collecting information regarding tagged items from a plurality of users;
 determining an existence of one or more trends among tags and associated items based on a predetermined criteria and an inferred relationship between the tagged items in an event that the predetermined criteria does not exist;
 examining convergence among the plurality of trends to identify that a predetermined convergence criteria has been met or to establish a new convergence criteria for taxonomy purposes in an event that the predetermined convergence criteria does not exist; and
 identifying a tagging criteria from the examination for taxonomy purposes.

* * * * *